Figure 1:
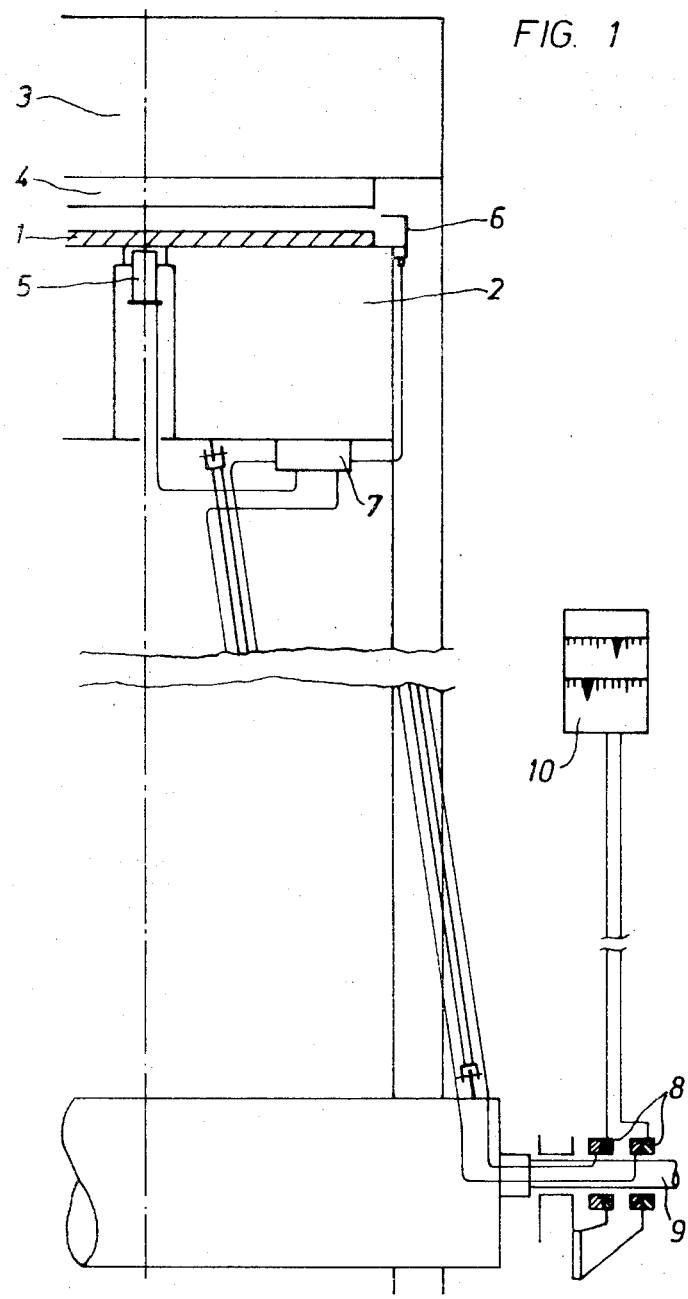

United States Patent [19]
Herzhoff et al.

[11] 3,864,843
[45] Feb. 11, 1975

[54] APPARATUS FOR CONTINUOUSLY MEASURING THE SURFACE TEMPERATURE OF MOVING WEBS

[75] Inventors: Peter Herzhoff, Leverkusen; Hans Gref, Cologne; Wolfgang Schweicher; Hans Frenken, both of Leverkusen; Josef Friedsam, Langenfeld; Günter Meinhardt, Leverkusen, all of Germany

[73] Assignee: AGFA-Gevaert Aktiengesellschaft, Leverkusen, Germany

[22] Filed: Mar. 9, 1973

[21] Appl. No.: 339,708

[30] Foreign Application Priority Data
Mar. 14, 1972 Germany............................ 22122276

[52] U.S. Cl. .................... 34/43, 73/1 F, 73/351, 73/355 R
[51] Int. Cl. ..................... G01k 13/08, G01j 5/18
[58] Field of Search ........ 34/48, 46, 43, 44; 73/151, 73/155

[56] References Cited
UNITED STATES PATENTS
2,575,922   11/1951   Langenwalter ...................... 73/351
2,611,974   9/1952    Stratveit et al. ......................... 34/48
2,928,185   3/1960    Drew ....................................... 34/43
3,211,893   10/1965   Barlow et al. ........................... 34/48
3,257,188   6/1966    Morgan et al. ......................... 34/48
3,313,140   4/1967    Trementozzi ......................... 73/1 F
3,350,789   11/1967   Davies .................................... 34/48
3,355,815   12/1967   Zimmer .................................. 34/48
3,358,974   12/1967   Bernard .................................. 34/48

FOREIGN PATENTS OR APPLICATIONS
585,119     11/1958   Italy ...................................... 73/351
1,379,634   10/1964   France ................................. 73/351

*Primary Examiner*—Charles J. Myhre
*Assistant Examiner*—Paul Devinsky
*Attorney, Agent, or Firm*—Connolly and Hutz

[57] ABSTRACT

In a wheel drier the temperature is continuously measured with a radiation pyrometer which is arranged in the rim of the drying wheel so that while the wheel rotates, the same surface element of the web always lies in the field of measurement of the pyrometer.

6 Claims, 2 Drawing Figures

APPARATUS FOR CONTINUOUSLY MEASURING THE SURFACE TEMPERATURE OF MOVING WEBS

This invention relates to an apparatus for continuously measuring the surface temperature of moving webs in wheel driers. The web is moved through the drier while a current of drying air is blown on it. The measuring apparatus is particularly suitable for determining the surface temperature of foils or webs of paper which are coated with photographic emulsions.

Contact-free measurement of surface temperatures by means of pyrometers is already known. It is also known to measure air temperatures with suitable instruments such as electrical resistance thermometers. The known means of following the progress of drying on a moving substance require considerable time and labour.

For the production of photographic films and papers, the surface temperature of the material during the drying process has a decisive influence on the quality of the end product. At each phase of the drying process, there is a direct connection between the residual moisture of the material and the temperature and humidity of the drying air. This applies not only to the first physical drying stage but also to the second stage of physical drying. The path along which the coated substrate is moved while drying by a current of air is subdivided into several air sections, the temperatures of which can be controlled independently of each other. In so-called wheel driers, the support band on which the material is to be dried lies on the circumferential surface of the wheel body in the second half of the total available drying path and is moved under the air jets of the adjacent sections at the peripheral speed of the wheel body. The temperatures of the drying air and of the material in this stage of the path have an important influence on the quality of the end product and optimum utilisation of the available drying path is primarily determined by these temperatures.

In the drying apparatus previously available, an electrical resistance thermometer for measuring the temperature of the drying air and a radiation pyrometer for measuring the surface temperature of the material were installed in each air drying section. These apparatus are very expensive and provide only a qualitative survey of the drying progress. Moreover, the accuracy of the information available from the measured data is seriously diminished by the following factors:

a. The large number of measuring points required inevitably leads to a large error of measurement.

b. Because of the relatively large distance between the individual measuring points, it is not possible to extrapolate the progress of drying between the measuring points. The provision of additional measuring points would, however, be very costly and moreover increase the probability of error. Since continuous measurement of the temperature of the web is not possible, indication of temperature changes is delayed. Thus for example the transition from the first physical drying section to the second physical drying section or the point at which the limit of drying is reached can only be detected at the next measuring point. In the most unfavorable cases, this leads to failure of optimum utilisation of the drying capacity.

It is an object of this invention to provide a measuring apparatus with which the temperature of the surface of the web can be continuously measured and recorded during the drying process in a wheel drier.

The invention therefore provides an apparatus for the continuous measurement of the surface temperature of a web which is being dried in a wheel drier, which apparatus comprises a radiation pyrometer arranged in the rim of the drying wheel on the circumferential surface of which the web is to be dried is arranged. The web and the pyrometer are transported at the peripheral speed of the drying wheel so that while the wheel rotates, the same surface element of the web always lies in the field of measurement of the pyrometer. The pyrometer therefore continuously measures the temperature of one surface element of the web during its passage through the wheel drier.

According to a further preferred feature of the invention, a temperature calibrating station is provided opposite the felly or rim of the drying wheel so that the radiation pyrometer passes through this station once with each rotation of the drying wheel. This temperature calibrating station consists in the simplest case of a radiant surface of known temperature and radiant characteristic.

The radiant surface of the temperature calibrating station advantageously consists of the same material as the web on the drying wheel. No temperature correction for radiant power is then required.

In many cases it is desirable to obtain a continuous measurement of the temperature of the drying air as well as of the temperature of the web. According to a further preferred feature of the invention, an additional temperature sensing and measuring device is arranged on the rim of the drying wheel.

An important preferred embodiment of the apparatus according to the invention is characterised by governor and control circuits which reproduce in the wheel drier a temperature/time curve or temperature/path curve which has been preset by diagrams.

The advantages achieved with the invention lie in the continuous measurement of the temperature of the web in its passage through the drier. This for the first time makes it possible to obtain a complete record of temperature/time curves or temperature/place curves in the drier. It is therefore possible to make accurate predictions about the progress of drying. Conversely, the drier can be adjusted to given drying programmes which are provided in the form of nominal temperature curves.

Strictly, the radiation pyrometer only measures the temperature of the reverse side of the web, but it has been found that owing to the low thermal capacity of the web there is practically no temperature difference between the front and back.

Figure 2:
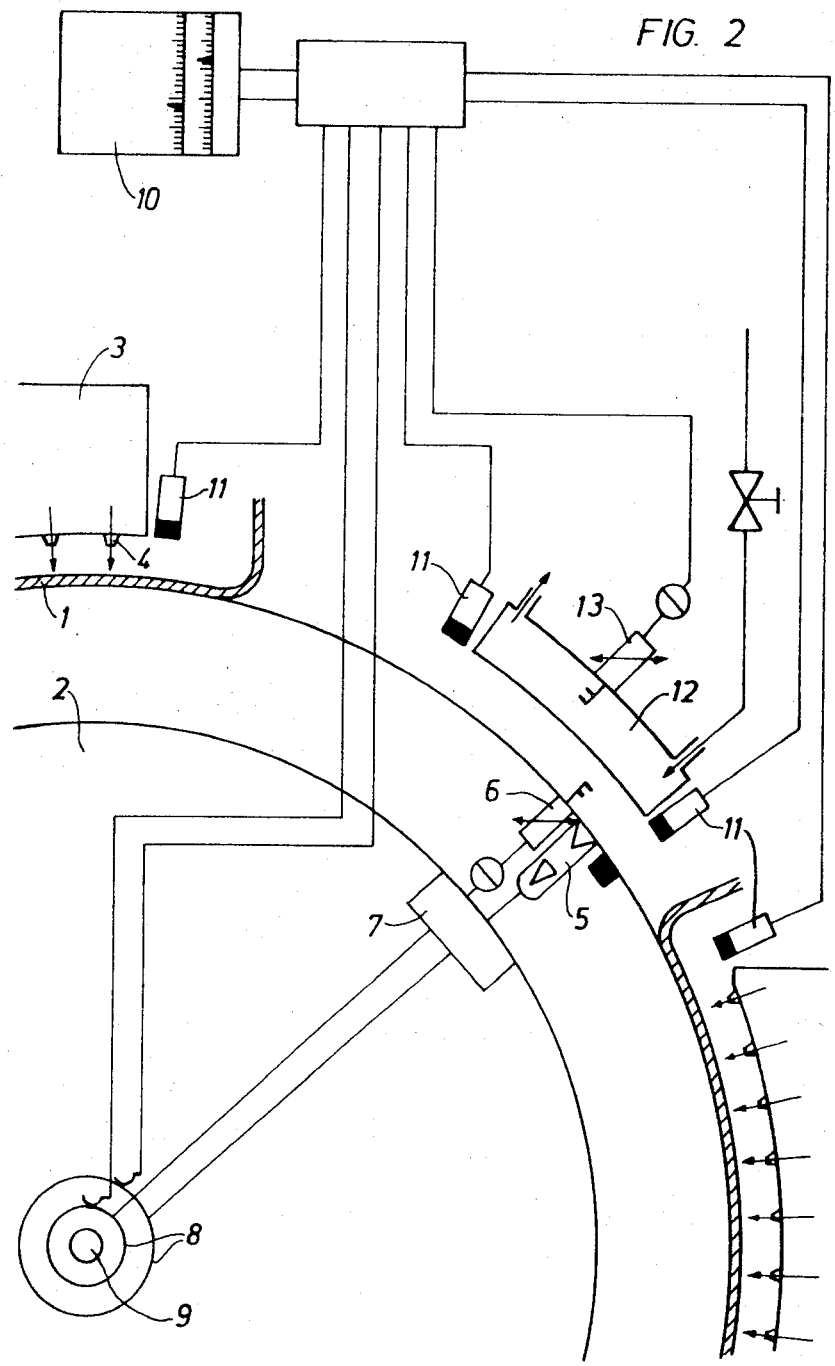

A practical example of the invention is described below with reference to the accompanying drawings in which FIG. 1 is a section through the overall arrangement and FIG. 2 is a side view of the overall arrangement.

The web 1 of material whose temperature is required to be measured lies on the circumferential surface of the wheel 2 and is moved under the drier 3 and nozzles 4 at the circumferential velocity of the wheel. There is a break through the centre of the wheel body 2 at one point for the installation of the radiation pyrometer 5.

The resistance thermometer 6 is arranged on the outer surface of the wheel felly and moved past the nozzles 4 of the drier 3 so that it measures the temperature of the inflowing air from the individual nozzles 4 of the drying sections. The electric output values of the pyrometer 5 and of the resistance thermometer 6 are in each case transmitted to an amplifier 7 which is arranged in the wheel felly 2 and therefore moves with the pyrometer or resistance thermometer. The output values of this amplifier 7 are picked up by sliprings 8 on the wheel axle 9 and transmitted to a recorder 10. The recorder 10 is synchronised with the wheel body 2 and therefore produces a diagram of constant length with each rotation of the wheel regardless of the velocity of the wheel. The portion of drying path traversed by the pyrometer 5 and thermometer 6 is subdivided true to scale on the transparent cover plate of the recorder 10. By this arrangement, the temperature graphs of the material and the temperature graphs of the drying air, which are recorded independently of each other by the recorder 10, are converted into temperature/place/time graphs by means of which the available drying capacity can be optimally utilized. A suitable circuit arrangement containing initiators 11 enables the measuring process to proceed automatically after operation of a starting switch and ensures accurate positioning of the recorded diagram under the marked cover plate.

It is known that when radiation pyrometers are used for measuring temperatures, the emission capacity of the material being measured has a substantial influence on the measurement obtained. In order that any deviations of the temperatures measured by the pyrometer 5 from the actual temperatures can be instantly recognised, a calibrating station 12 shown in FIG. 2 is arranged at the entrance to the measuring path in such a manner that the pyrometer 5 passes through it before each measuring operation. The calibrating station 12 consists of a copper cooler through which cooling water runs and the surface of which is covered with a foil of the same material as that which is to be dried. The temperature of the cooler of the calibrating station 12 is measured with an electrical resistance thermometer 13 and at each revolution of the wheel this temperature is recorded as a short calibrating trace parallel to the temperature measured by the pyrometer 5 at the beginning of the measuring operation, thereby ensuring that a continuous and calibrated measurement of the temperature of the web 1 is obtained.

It is claimed:

1. An apparatus for continuously measuring the residual moisture in moving webs during the process of drying in which the web is carried upon the circumferential surface of a wheel rotating about a shaft and is moved successively under a plurality of jets of drying air directed onto the web along the peripheral path of the drying wheel, comprising a radiation pyrometer mounted within and adjacent the circumference of the wheel and directed toward the inner side of the web for measuring the temperature of a surface element of the web when passing through the drier, an air-temperature sensor mounted adjacent the rim of the wheel for measuring the temperature of the drying air ejected from successive nozzles along the drying path, means connecting said radiation pyrometer and air temperature sensor to sliding contacts at the shaft, a recording device, and sliding contacts at the shaft connecting the radiating pyrometer said air-temperature sensor to the recording device for transmitting the electrical signals produced by the radiation pyrometer and the air-temperature to the recording device and wherein the recorder has a moving element corresponding to the drying wheel, traversing means being connected to the moving element for providing a time-coordinated record of the temperature readings obtained by the radiating pyrometer and air temperature sensor, and the traversing means being synchronized with the drying wheel whereby a temperature record coordinated with each rotation of the wheel is obtained.

2. An apparatus according to claim 1 wherein the radiation pyrometer and the air-temperature sensor are connected to an amplifier, the amplifier is mounted within the wheel, and the amplifier being constructed and arranged for transmitting its output signals via the sliding contacts to the recording device.

3. An apparatus as claimed in claim 1 in which a temperature calibrating station is provided opposite the rim of the drying wheel.

4. An apparatus as claimed in claim 3 in which the temperature calibrating station consists of a radiating surface of known temperature and radiating characteristic.

5. An apparatus as claimed in claim 4 in which the radiating surface of the calibrating station consists of the same material as the web on the drying wheel.

6. An apparatus as set forth in claim 1 wherein the air-temperature sensor comprises an electrical resistance thermometer.

* * * * *